United States Patent [19]

Born

[11] Patent Number: 4,589,563
[45] Date of Patent: May 20, 1986

[54] HIGH-PRESSURE CONTAINER AND METHOD OF MAKING THE SAME

[75] Inventor: Gerald W. Born, Eldora, Iowa

[73] Assignee: Quality Products, Inc., Eldora, Iowa

[21] Appl. No.: 649,076

[22] Filed: Sep. 10, 1984

Related U.S. Application Data

[63] Continuation-in-part of Ser. No. 472,580, Mar. 7, 1983, Pat. No. 4,518,558.

[51] Int. Cl.$^4$ .............................................. B65D 7/42
[52] U.S. Cl. ......................................... 220/3; 220/83; 264/516
[58] Field of Search ...................... 220/3, 5 R, 66, 67, 220/85 F, 83; 264/516

[56] References Cited

U.S. PATENT DOCUMENTS

| | | | |
|---|---|---|---|
| 3,360,411 | 12/1967 | Ponemon | 220/3 X |
| 3,508,677 | 4/1970 | Laibson et al. | 220/3 |
| 3,705,931 | 12/1972 | Confer et al. | 264/516 X |
| 3,843,010 | 10/1974 | Morse et al. | 220/3 |
| 3,866,792 | 2/1975 | Minke | 220/83 X |
| 3,898,310 | 8/1975 | Schiemann | 264/516 X |

*Primary Examiner*—Steven M. Pollard
*Attorney, Agent, or Firm*—Kane, Dalsimer, Kane, Sullivan and Kurucz

[57] ABSTRACT

A high-pressure container, and a method and apparatus for making the same, is disclosed having a top portion defined as an injection molded portion. The injection molded portion is provided with rings which are fused to the other portion to provide a strong mechanical interlock therebetween. The top portion is pre-fabricated and then the second portion is blow molded around the top portion.

5 Claims, 9 Drawing Figures

HIGH-PRESSURE CONTAINER AND METHOD OF MAKING THE SAME

RELATED APPLICATIONS

This is a continuation-in-part application to application Ser. No. 472,580, filed Mar. 7, 1983, now U.S. Pat. No. 4,518,558.

BACKGROUND OF THE INVENTION

1. Field of Invention

This invention relates to plastic molding methods and apparatus and, more particularly, to methods and apparatus for forming one-piece, hollow plastic articles having a blow-molded portion fused to a second prefabricated portion.

2. Description of the Prior Art

In the art of blow molding hollow plastic articles, a tubular parison is extruded from an extrusion head in a semi-soft condition and at an elevated molding temperature. The parison is formed in the part of a closable blow mold which usually comprises a pair of mold halves having an inner surface which conforms to the desired outer surface configuration of the article to be molded. The mold halves are closed on the parison to form an access opening around a blowing pin at one end of the mold and to pinch off and seal the parison at the other end of the mold. Air is admitted to the interior of the parison through the blowing pin, to expand the parison against the mold surface and mold conducts heat from the molded article to cause the plastic to form a solid molded object. The mold halves are then separated and the article is removed from the molding apparatus.

Many blow-molded containers have a reduced diameter threaded neck which is molded around the mold blow pin and held by the mold while the parison is blown to conform to the remainder of the container. In blow molding containers having relatively wide mouth access openings, certain manufacturing dilemmas are presented. If a relatively large diameter parison is selected to mold a container having a wide mouth opening, relatively little radial expansion of the parison is accomplished and folds and imperfect definitions obtain on the outer surface of the molded article. Moreover, a large pinch-off or tear line occurs across the closed end of the container. If on the other hand, a small diameter parison is used for a container having a relatively wide access opening, the parison cannot mold itself to the wide mouth aperture without leaving an annular cap at the opening which must be later machined.

A solution to the foregoing problem is offered in U.S. Pat. No. 3,371,376, wherein a container having a large mouth opening is blow-molded. The parison has a relatively small diameter compared to the diameter of the container and the neck opening to be molded. The patentees provide an expanding device which includes a plurality of fingers designed to move radially apart in the horizontal plane after receiving the parison to stretch the open mouth of the parison to conform to the wide open mouth of the container. During the expanding operation, however, the mold segments are closed on the parison and air must be blown into the parison to support the parison prior to sealing the mold. This technique, however, not only results in an uncontrolled manipulation of the parison but requires a considerable amount of excess compressed air in the molding operation, and therefore increased production costs.

In addition it has been found that containers made by the standard blow molding methods are not suitable for certain applications, as, for example, for holding fluids at very high pressures.

OBJECTIVES AND SUMMARY OF THE INVENTION

An objective of the present invention is to provide a method and apparatus for producing molded containers which can withstand high pressure.

A further objective is to provide a method and apparatus for producing the above-mentioned containers inexpensively. Other objectives and advantages of invention shall become apparent in the following description of the invention.

According to this invention, hollow plastic articles are produced by the steps of downwardly extruding a tubular plastic parison at a predetermined extrusion rate to form a mouth. During the downward travel of the tubular parison, the open mouth of the parison is grasped, expanded, and guided over a performed neck portion positioned in axial alignment with the parison extrusion head and in a position to cooperate with a portion of a hollow mold so that it can be secured to the blow-molded portion made from the parison.

The techniques of the invention are particularly adapted to produce integral re-inforced openings for high pressure hollow containers. However, it will be appreciated that the teaching of the invention are also adapted to produce hollow containers having a wide variety of access openings.

A further aspect of the invention is to produce a hollow plastic article by a combination of a blow molded portion and a prefabricated portion, said portions being fused together to form a strong mechanical interlock. To this end, the prefabricated section is provided with a plurality of rings which are fused to the blow-molded portion to produce a strong container which can resist high internal pressures.

DETAILED DESCRIPTION OF THE INVENTION

Figure 1:
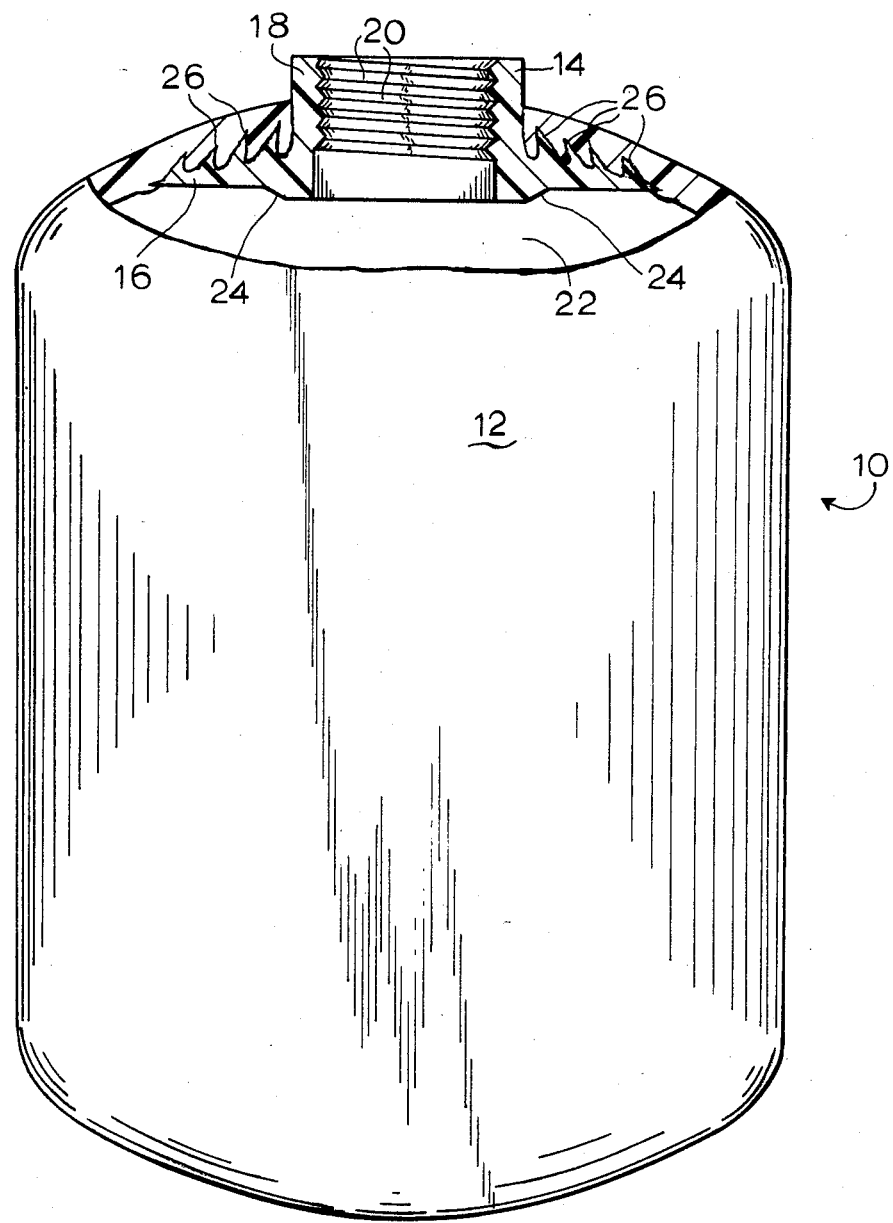
FIG. 1 is an elevational view of a hollow plastic article, with portions broken away for clarity, produced in accordance with the teachings of this invention.
Figure 2:
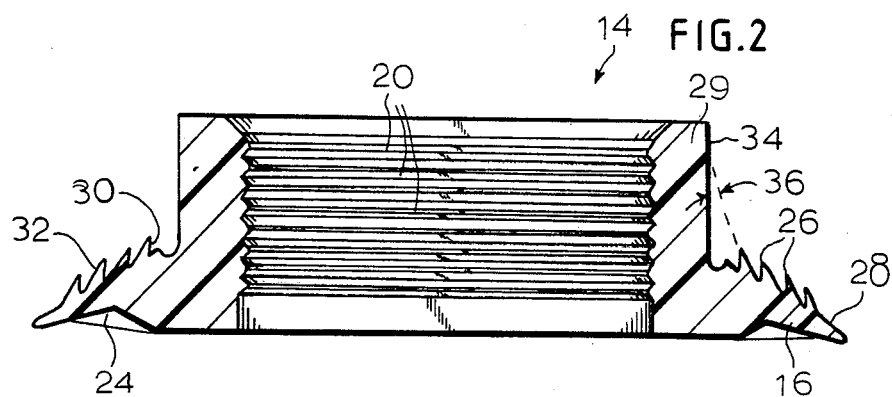
FIG. 2 is a side-sectional view of the pre-fabricated portion.
Figure 3:
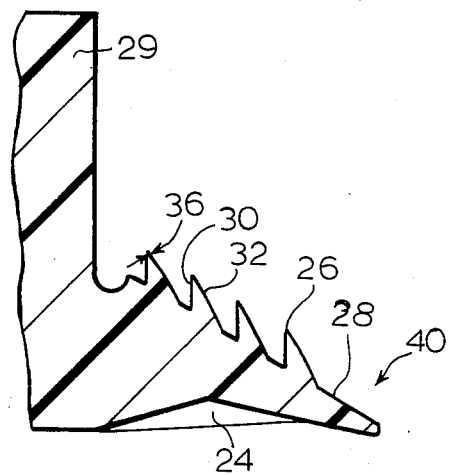
FIG. 3 is a blown-up view of the insert showing the rings.
Figure 4:
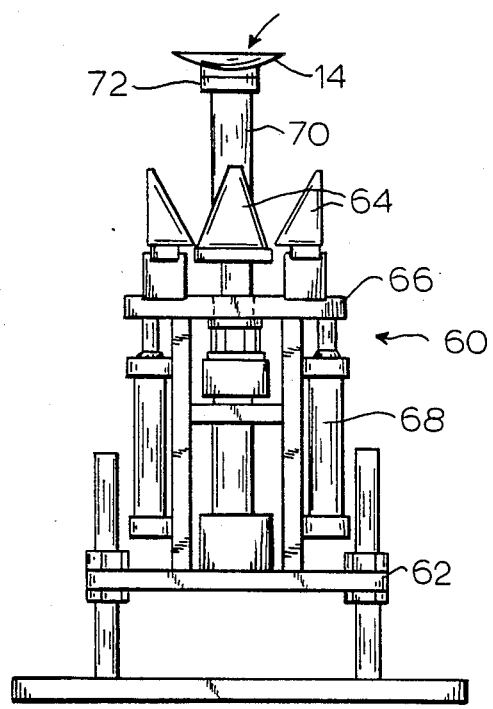
FIG. 4 is an elevational view, of a parison stretching device according to this invention.

Referring now to the drawings, and initially to FIG. 1, there is illustrated a hollow molded article 10 which is produced in accordance with the teachings of this invention. The article 10 is a hollow molded tank having a blow-molded portion 12 and a top portion or insert 14. Included in the top portion 14 are a disc 16 and a tubular section 18 with internal threads 20 which gives access to the interior 22 of the blow-molded portion 12. Top portion 14 is provided to reinforce the container and therefore it is prefabricated of relatively light but strong material such as a fiberglass compound of high molecular polythylene able to withstand up to 900 psi. Radial ribs 24 extend between tubular section 18 and disc 16 to reinforce said top section 14. On the top surface 28 of disc 14 there are a plurality (four are shown in FIGS. 2 and 3) of rings 26. Each of these rings are defined by an inner wall 30 which is in parallel with outer wall 34 of tubular section 18 and a slanted outer wall 34 of tubular section 18 and a slanted outer wall 32 angled toward section 28 as shown. It has been found that the angle between the outer wall 32 and inner wall 30, i.e. angle 36 on FIGS. 3, and 4 is critical. If this angle is too small or two large, when the container of FIG. 1 is pressurized the portions 12 and 14 separate because a mechanical interlock between is insufficient even if they are fused. Preferably angle 36 is about 30°. Similarly angle 40 between top surface 28 and the plane perpendicular to the longitudinal axis of container 10 should also be about 30°.

When position 12 is molded around top portion 14, its top section is engaged by and fused to disc surface 28 and its rings form a strong mechanical interlock therebetween.

Portion 14 may be prefabricated prior to the blow molding of portion by 12 by standard techniques such as injection molding.

Referring now to FIGS. 4 through 9, the article 10 may be produced by an apparatus which includes a conventional parison extrusion head 50, a segmented hollow mold 52 which, in the illustrated embodiments, includes a pair of mold halves 54 and 56 having an inside surface 58 which defines the outside surface of the article 10 to be molded, and a parison stretching assembly 60.

Figure 5:
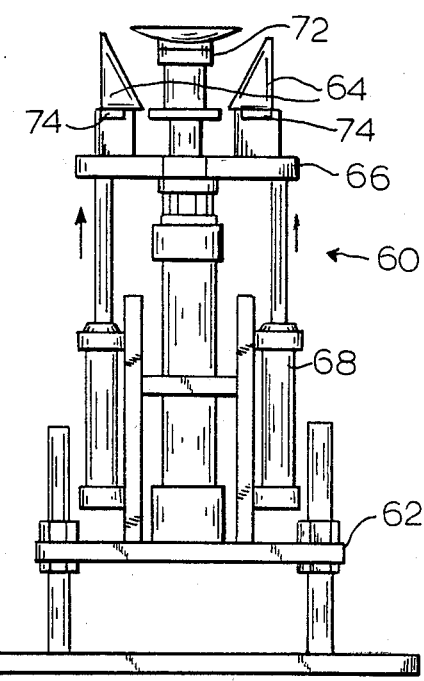
FIG. 5 is another elevational view of the parison stretching device in an intermediate position.
Figure 6:
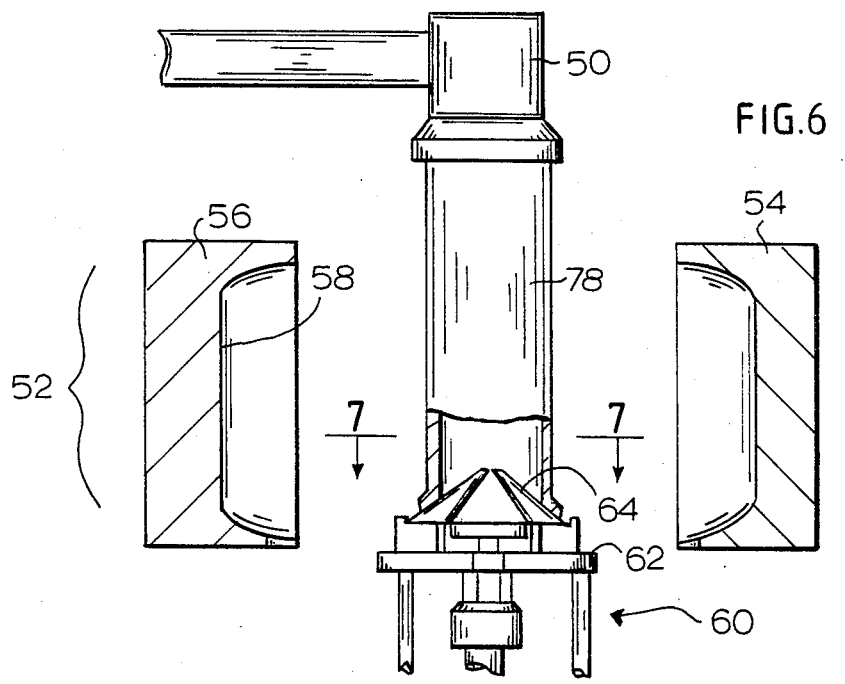
FIG. 6 is an elevational view, partly in section, of the apparatus according to this invention, showning the molding apparatus in a parison receiving position.
Figure 7:
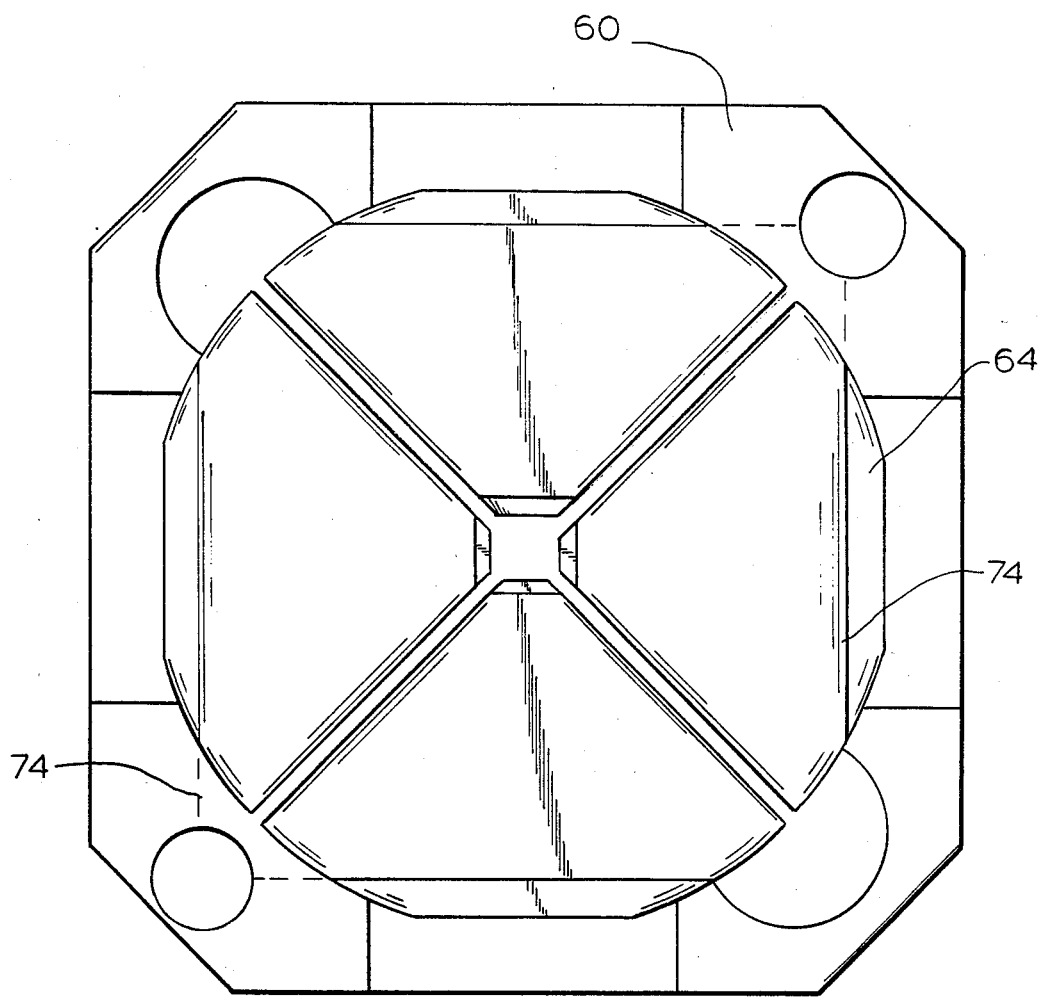
FIG. 7 shows the plates of the parison stretching device in a closed position.

Assembly 60 comprises a base 62 which supports a plurality of curved plates 64. The plates are arranged on a first platform 66 mounted on rod and piston assemblies 68. A rod 70 axially disposed through an appropriate hole through platform 66 supports a second platform 72 which is provided to hold insert 14 as shown. Rod and piston assemblies 68 are provided to move platform 66 and plates 64 from a lower position below platform 72 to an upper position above said platform 72 as shown in FIGS. 4, 5 and 6. (In FIG. 5 one of the plates 42 has been cut away for the sake of clarity). The plates are pivotally secured to platform 66 by pins 74 which permits them to turn radially inwards so that in the upper position they can form a protective dome over said portion 14, as shown in FIG. 6. A top view of the plates in the closed position of FIG. 6 is shown in FIG. 7. Pneumatically operated control rods are used to pivot plates 64 around pin 74. These rods have been omitted for the sake of clarity.

At the beginning of the molding process the first platform 66 is raised and the plates are closed (see FIGS. 4, 5, 6 and 7) around platform 72 and portion 14 disposed thereon.

Figure 8:
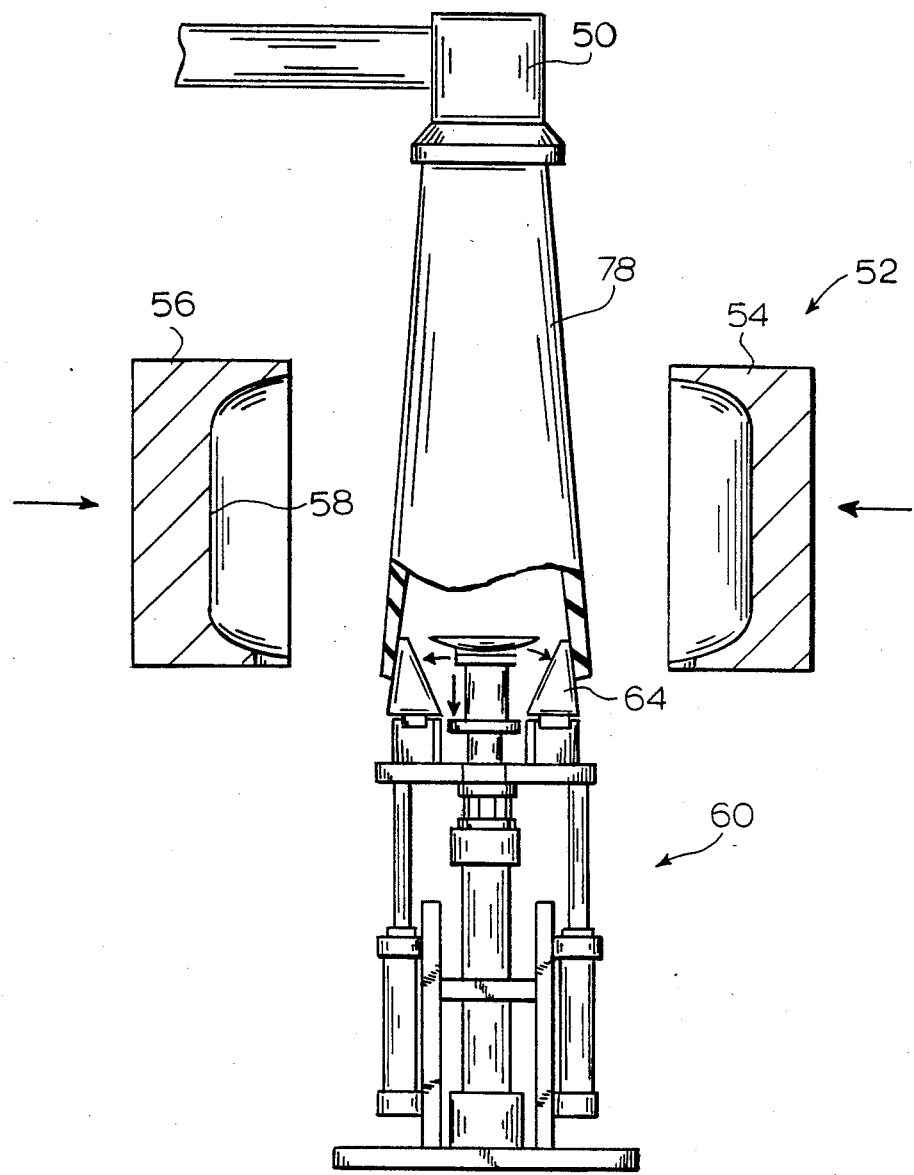
FIG. 8 is a view similar to FIG. 6, but showing the apparatus in an intermediate state in the molding operation.

A tube or parison 78 is next extruded downwardly by the extrusion head 50 and is in a flowable plastic state in the condition illustrated in FIGS. 6 and 8. The extrusion rate is inversely proportional to the extruded wall thickness of the parison so that a fast extrusion rate produces a relatively thin wall and slow rate produces a relatively thick wall.

When the parison reaches the position illustrated in FIG. 6 of the drawings, it has just encircled the plurality of inwardly directed plate 64. As previously mentioned, in this position the plates form a protective dome over the portion 14. Next the plates separate as they move downward to pull down the parison to envelope portion 14 as shown in FIG. 8.

Figure 9:
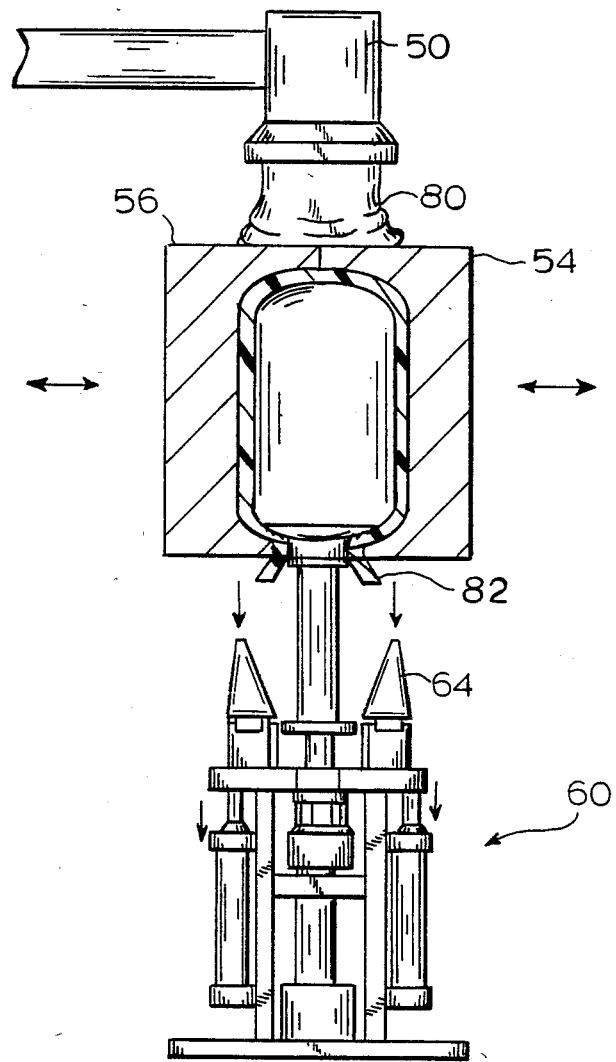
FIG. 9 is an illustration similar to FIGS. 6 and 8 but showing the molding apparatus in a final molding position.

When the parison has completed its travel to envelop the position 14, the mold segments 54 and 56 are moved radially inwardly to the position illustrated in FIG. 9. The mold surface 58 surrounds a major portion of the parison and pinches off the top and the bottom of the parison as indicated at locations 80 and 82, and position 14 it gets fused to portion 14. Since the mold surface is still soft it is easily pushed by mold segments 54, 56 against annular rings 26 so that the ring penetrate the corresponding section of portion 12 thereby completing the fusing of the two positions.

After the mold segments are brought together to the position illustrated in FIG. 9, air is admitted to the parison through a passageway through rod 70 (not shown). The parison is thereby expanded until it conforms to the mold surface 58. After a suitable cooling period, which is promoted by the natural heat sink of the mold segments 54 and 56 and is typically about 170 seconds, the mold segments 54 and 56 are opened.

Since portion 14 is loosely held by pedestal 80 and is not attached thereto, it is molded into and carried by the molded portion 12.

Although the preferred embodiment of this invention has been shown and described, it should be understood that various modifications and rearrangements of the parts may be resorted to without departing from the scope of the invention as disclosed and claimed herein.

What is claimed is:

1. A high-pressure plastic container comprising:
   a neck having a tubular mouth with a longitudinal axis and a disc disposed around said mouth, said disc having an upper surface extending radially away from said axis, with a plurality of upwardly extending rings; and
   a blow molded body having a top section coextensive with said disc and engaged by said rings;
   whereby the rings prevent separation between the neck and the body while the container is pressurized.

2. The container of claim 1 wherein the rings are defined by an inner wall and an outer wall said inner and outer wall forming an angle of about 30°.

3. The container of claim 1 wherein said upper surface is disposed at an angle of about 30° with respect to a plane perpendicular to the longitudinal axis of the container.

4. The container of claim 1 wherein said top portion is made of a high-impact plastic materials.

5. The container of claim 4 wherein said plastic material is a highly molecular weight polyethylene.

* * * * *